US012689927B2

(12) United States Patent
Wu et al.

(10) Patent No.: US 12,689,927 B2
(45) Date of Patent: Jul. 21, 2026

(54) MOBILE COMMUNICATION SYSTEM AND USAGE SCENARIO DETERMINATION METHOD FOR THE SAME

(71) Applicant: MEDIATEK Inc., Hsinchu City (TW)

(72) Inventors: Chun-Yen Wu, Hsinchu City (TW); Jen-Chung Chiang, Hsinchu City (TW); Chung-Yu Hung, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 317 days.

(21) Appl. No.: 18/363,027

(22) Filed: Aug. 1, 2023

(65) Prior Publication Data

US 2024/0064551 A1     Feb. 22, 2024

Related U.S. Application Data

(60) Provisional application No. 63/371,527, filed on Aug. 16, 2022.

(51) Int. Cl.
| | |
|---|---|
| *H04W 24/10* | (2009.01) |
| *H01Q 1/24* | (2006.01) |
| *H01Q 5/335* | (2015.01) |
| *H04W 24/08* | (2009.01) |

(52) U.S. Cl.
CPC ............ *H04W 24/10* (2013.01); *H01Q 1/243* (2013.01); *H01Q 5/335* (2015.01); *H04W 24/08* (2013.01)

(58) Field of Classification Search
CPC ...... H04W 24/10; H04W 24/08; H01Q 1/243; H01Q 5/335; H04M 1/72454
See application file for complete search history.

(56) References Cited

U.S. PATENT DOCUMENTS

| | | | | |
|---|---|---|---|---|
| 2015/0372656 A1* | 12/2015 | Mow | ......................... | H03H 7/38 |
| | | | | 455/77 |
| 2016/0134254 A1* | 5/2016 | Backes | .................... | H03H 7/40 |
| | | | | 343/861 |
| 2017/0346178 A1* | 11/2017 | Shi | ......................... | H04B 17/12 |
| 2018/0083344 A1* | 3/2018 | Han | ..................... | H01Q 13/106 |
| 2020/0186203 A1* | 6/2020 | Kim | ........................ | H04B 7/024 |
| 2022/0030618 A1* | 1/2022 | Wang | ................. | H04W 72/569 |
| 2022/0217042 A1* | 7/2022 | Santhanam | .......... | H04B 7/0404 |

* cited by examiner

*Primary Examiner* — Noel R Beharry
*Assistant Examiner* — Phillip J Kearns
(74) *Attorney, Agent, or Firm* — McClure, Qualey & Rodack, LLP

(57) ABSTRACT

A mobile communication system and a usage scenario determination method for the same are provided. The usage scenario determination method comprises: determining a first antenna scenario based on a first impedance measurement on a first transmission antenna; determining a second antenna scenario based on either a second impedance measurement on a second transmission antenna or a sensor information or a receiving antenna tuner states sweeping result; and determining a usage scenario of the mobile communication system based on both the first antenna scenario and the second antenna scenario.

10 Claims, 9 Drawing Sheets

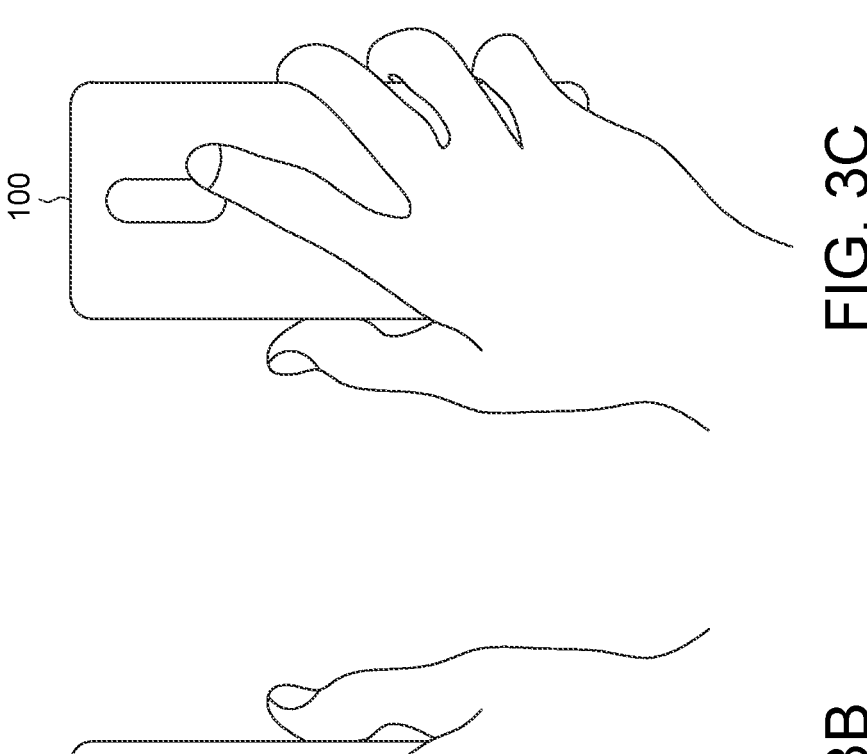
FIG. 3C
FIG. 3B
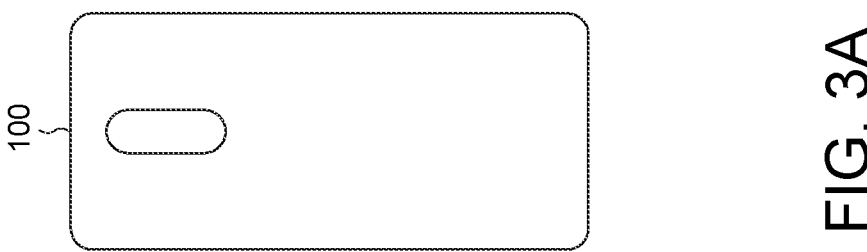
FIG. 3A

100

100

MOBILE COMMUNICATION SYSTEM AND USAGE SCENARIO DETERMINATION METHOD FOR THE SAME

CROSS-REFERENCE TO RELATED ART

This application claims the benefit of U.S. Provisional Application No. 63/371,527, filed on Aug. 16, 2022, the entirety of which is incorporated by reference herein.

TECHNICAL FIELD

The disclosure relates in general to a mobile communication system and a usage scenario determination method for the same.

BACKGROUND

With the advancements in mobile communication technology, mobile communication systems such as mobile phones, tablet computers, notebook computers, and other hybrid functional portable communication electronic devices have become more common. To satisfy user demand, mobile communication systems can usually perform wireless communication functions.

In some application, there is a need to determine a usage scenario of the mobile communication systems. If the usage scenario determination is not accuracy, then the user experience may be negatively affected.

Thus, there needs a mobile communication system and a usage scenario determination method for the same, which can determine usage scenario more accurately.

SUMMARY

According to one embodiment, a usage scenario determination method of a mobile communication system is provided. The usage scenario determination method comprises: determining a first antenna scenario based on a first impedance measurement on a first transmission antenna; determining a second antenna scenario based on either a second impedance measurement on a second transmission antenna or a sensor information or a receiving antenna tuner states sweeping result; and determining a usage scenario of the mobile communication system based on both the first antenna scenario and the second antenna scenario.

In some embodiments, the first antenna scenario includes a free space mode and a single hand mode; the second antenna scenario includes the free space mode, a single hand mode and a table mode; and the usage scenario of the mobile communication system includes a single hand use mode, a gaming hand mode and a navigation mode.

In some embodiments, when the first antenna scenario is the free space mode and the second antenna scenario is the single hand mode, the usage scenario of the mobile communication system is the single hand use mode; when the first antenna scenario is the single hand mode and the second antenna scenario is the free space mode, the usage scenario of the mobile communication system is the single hand use mode; when both the first antenna scenario and the second antenna scenario are the single hand mode, the usage scenario of the mobile communication system is the gaming hand mode; and when the first antenna scenario is the free space mode and the second antenna scenario is the table mode, the usage scenario of the mobile communication system is the navigation mode.

In some embodiments, when a power headroom (PHR) parameter is over a scenario detection trigger threshold, the first impedance measurement on the first transmission antenna is triggered.

In some embodiments, when a download throughput is dropped below a throughput threshold and when a SNR (signal-noise ratio) is dropped below an SNR threshold, collection of the sensor information is triggered.

In some embodiments, a plurality of corresponding receiving antenna tuner states used in different usage scenarios are sweeping to generate the receiving antenna tuner states sweeping result before determining the second antenna scenario.

In some embodiments, the usage scenario determination method further comprises: crossing check of the first antenna scenario and the second antenna scenario before determining the usage scenario of the mobile communication system based on both the first antenna scenario and the second antenna scenario.

According to another embodiment, a mobile communication system is provided. The mobile communication system includes: an antenna group; a coupler coupled to the antenna group, the coupler being used in impedance measurement of the antenna group; a controller coupled to the coupler; and a sensor coupled to the controller, the sensor for sensing and sending sensor information to the controller. The controller is configured for: determining a first antenna scenario based on a first impedance measurement on a first transmission antenna of the antenna group; determining a second antenna scenario based on either a second impedance measurement on a second transmission antenna of the antenna group or the sensor information or a receiving antenna tuner states sweeping result; and determining a usage scenario of the mobile communication system based on both the first antenna scenario and the second antenna scenario.

BRIEF DESCRIPTION OF THE DRAWINGS

FIG. 3A to FIG. 3E show several usage scenarios of the mobile communication system according to one embodiment of the application.

Figure 1:
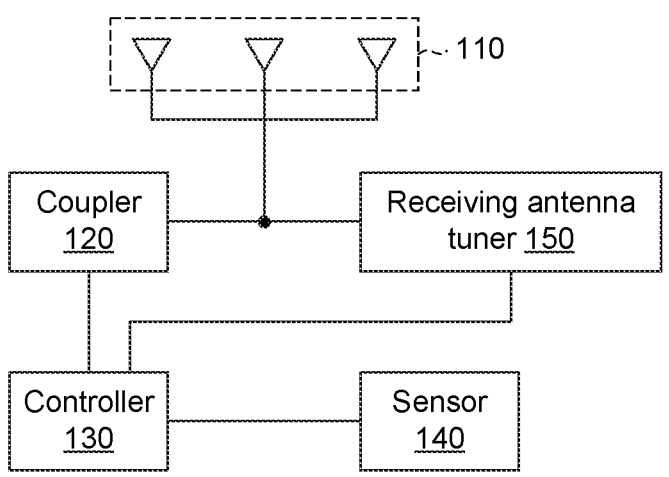
FIG. 1 is a diagram of a mobile communication system according to a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

First Embodiment

FIG. 1 is a diagram of a mobile communication system 100 according to a first embodiment of the invention. The mobile communication system 100 may be applied to a mobile device, such as a smart phone, a tablet computer, or a notebook computer, but it is not limited thereto. As shown in FIG. 1, the mobile communication system 100 includes an antenna group 110, a coupler 120, a controller 130, a sensor 140 and a receiving antenna tuner 150. It should be understood that the mobile communication system 100 may include other components, such as a processor, a power supply module, a touch control panel, and/or a housing, although they are not displayed in FIG. 1.

The antenna group 110 includes at least two antennas. The type and style of the antenna group 110 are not limited in the invention. For example, the antenna of the antenna group 110 may be an RF module, a monopole antenna, a dipole antenna, a loop antenna, a hybrid antenna, or a PIFA (Planar Inverted F Antenna).

The coupler 120 is coupled to the antenna group 110. Specifically, the coupler 120 may have a first port coupled to the RF module (not shown), a second port coupled to the antenna group 110, and a coupling port coupled to the controller 130. The coupler 120 may be used in impedance measurement of the transmission antennas of the antenna group 110. Based on the impedance measurement results of the transmission antennas of the antenna group 110, the controller 130 may determine the transmission antenna scenario (or said the first and/or second antenna scenario).

In some embodiment, the controller 130 is implemented with a communication IC (Integrated Circuit). The controller 130 can receive antenna information from the coupler 120. The antenna information may be relative to any operational characteristics of the antenna group 110.

The sensor 140 is coupled to the controller 130. The sensor 140 is for sensing and sending the sensor information to the controller 130. The sensor 140 is for example but not limited by, gyroscope, proximity sensor or light sensor which is common used in the mobile communication system. Based on the sensor information from the sensor 140, the controller 130 may determine the receiving antenna scenario (or said the second antenna scenario).

The receiving antenna tuner 150 could be used for sweeping for SNR improvement. In the first embodiment of the application, the receiving antenna tuner 150 is optional. The receiving antenna tuner 150 is coupled to the antenna group 110 and the coupler 120. The receiving antenna tuner 150 is coupled between the antenna group 110 and the coupler 120. The receiving antenna tuner 150 is controlled by the controller 130 to optimize the antenna impedance matching.

Figure 2:
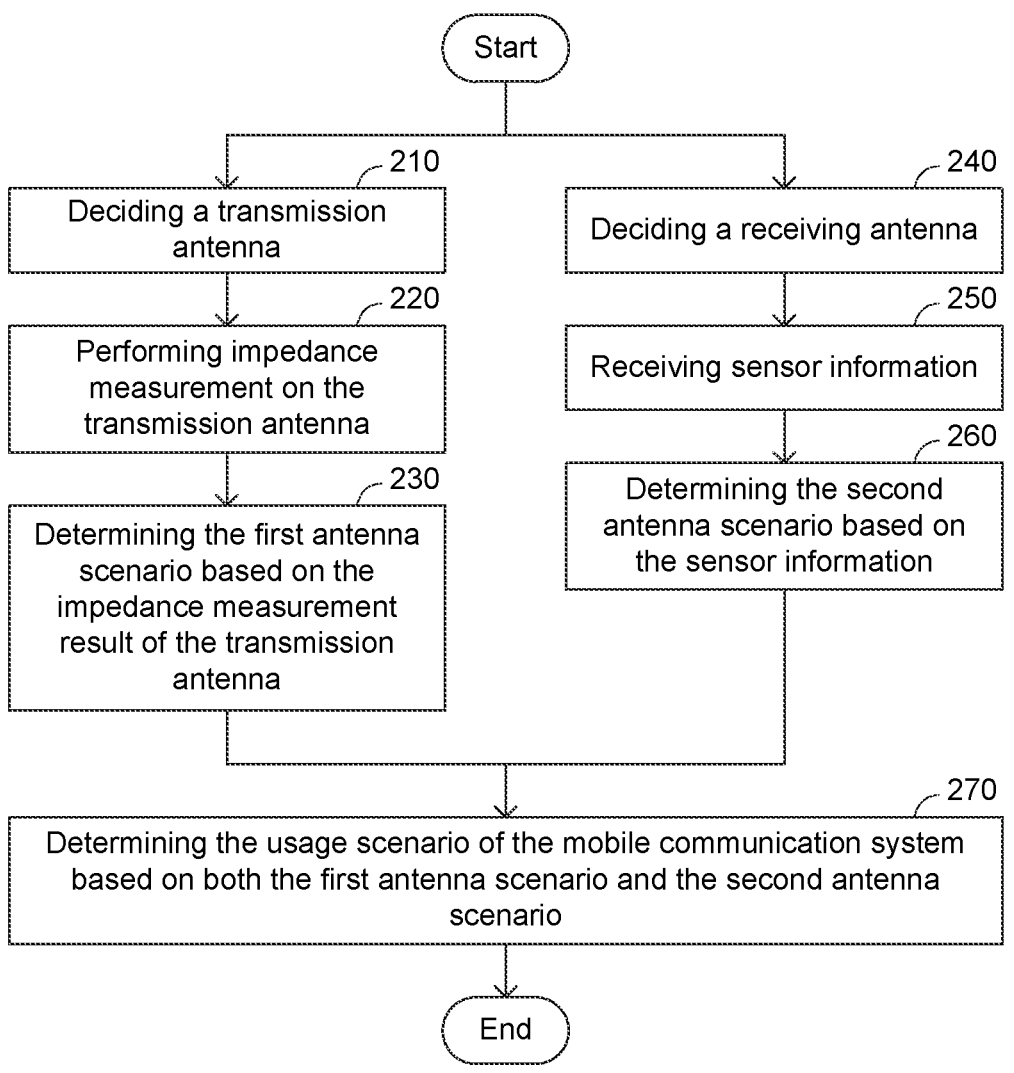
FIG. 2 shows a flow chart of a usage scenario determination method for a mobile communication system according to the first embodiment of the application.

FIG. 2 shows a flow chart of a usage scenario determination method for a mobile communication system according to the first embodiment of the application. In the step 210, the controller 130 decides a transmission antenna among the antenna group 110. In the step 220, the impedance measurement is performed on the transmission antenna. Details of impedance measurement are not specified here.

In the step 230, the transmission antenna scenario (or said the first antenna scenario) is determined by the controller 130 based on the impedance measurement result of the transmission antenna. In one possible example, the transmission antenna scenario (or said the first antenna scenario) includes, for example but not limited by, a FS (free space) mode, a single hand mode and the like.

In the step 240, the controller 130 decides a receiving antenna among the antenna group 110. In the step 250, the controller 130 receives the sensor information from the sensor 140.

In the step 260, the receiving antenna scenario (or said the second antenna scenario) is determined by the controller 130 based on the sensor information from the sensor 140. In one possible example, the receiving antenna scenario (or said the second antenna scenario) includes, for example but not limited by, the FS (free space) mode, the single hand mode, a table mode and the like.

In the step 270, the controller 130 determines the usage scenario of the mobile communication system 100 based on both the transmission antenna scenario (or said the first antenna scenario) and the receiving antenna scenario (or said the second antenna scenario).

In one possible example, the usage scenario of the mobile communication system 100 includes, for example but not limited by, a single hand use mode, a gaming hand mode and a navigation mode.

The relationship between the transmission antenna scenario (or said the first antenna scenario), the receiving antenna scenario (or said the second antenna scenario) and the usage scenario of the mobile communication system 100 is listed in the following table 1.

TABLE 1

| | transmission antenna scenario | receiving antenna scenario | usage scenario |
|---|---|---|---|
| 1 | FS mode | single hand mode | single hand use mode |
| 2 | single hand mode | FS mode | single hand use mode |
| 3 | single hand mode | single hand mode | gaming hand mode |
| 4 | FS mode | Table mode | navigation mode |

As shown in table 1, for example, when the transmission antenna scenario is the FS mode and the receiving antenna scenario is the single hand mode, the usage scenario of the mobile communication system 100 is the single hand use mode; when the transmission antenna scenario is the single hand mode and the receiving antenna scenario is the FS mode, the usage scenario of the mobile communication system 100 is the single hand use mode; when both the transmission antenna scenario and the receiving antenna scenario are the single hand mode, the usage scenario of the mobile communication system 100 is the gaming hand mode (i.e. the mobile communication system 100 is held by both two hands of the user); and when the transmission antenna scenario is the FS mode and the receiving antenna scenario is the table mode, the usage scenario of the mobile communication system 100 is the navigation mode (i.e. the mobile communication system 100 is placed on the table or on the mobile phone holder).

Figure 3D:
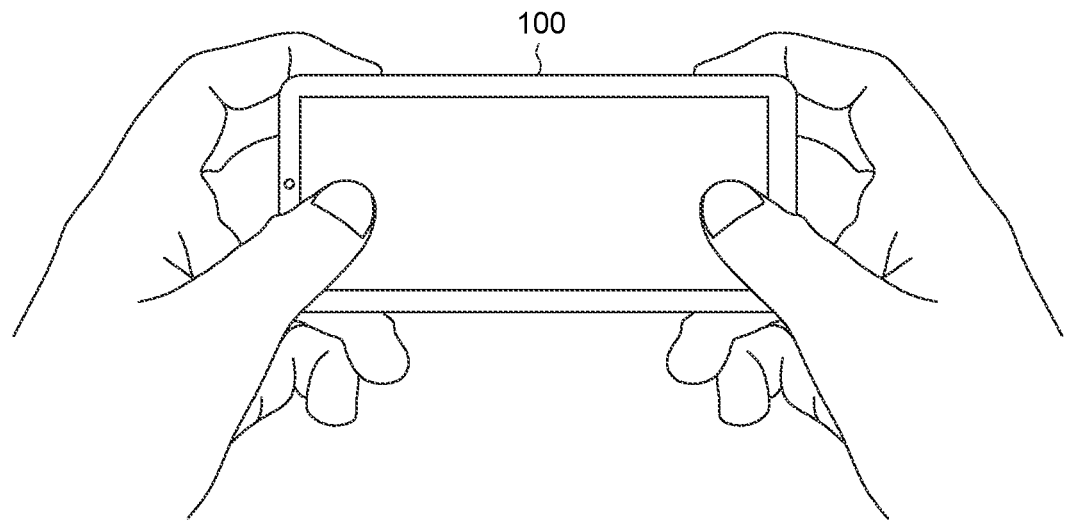
Figure 3E:
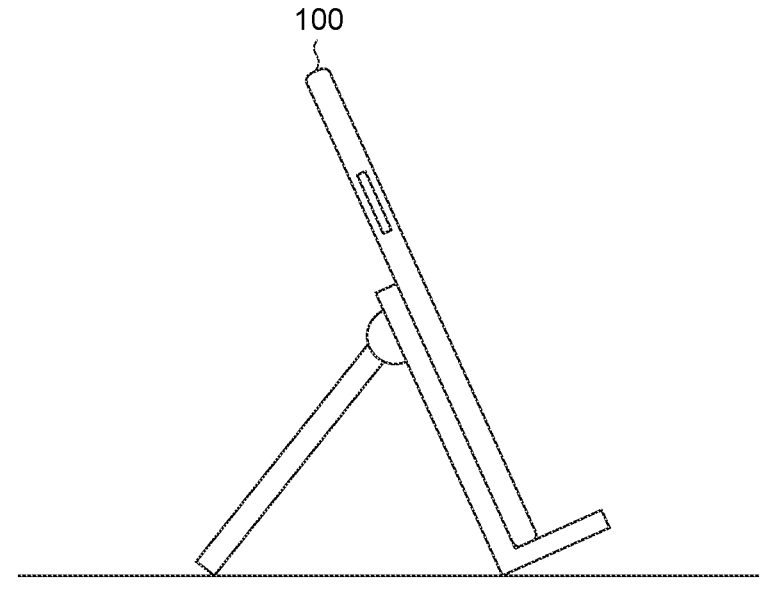

FIG. 3A is a diagram of the mobile communication system 100 in free space mode according to an embodiment of the invention. FIG. 3B is a diagram of the mobile communication system 100 held by a left hand of a user (i.e. the single hand use mode) according to an embodiment of the invention. FIG. 3C is a diagram of the mobile communication system 100 held by a right hand of the user (i.e. the single hand use mode) according to an embodiment of the invention. FIG. 3D is a diagram of the mobile communication system 100 held by two hands of the user (i.e. the gaming hand mode) according to an embodiment of the invention. FIG. 3E is a diagram of the mobile communication system 100 in the mobile phone holder (i.e. the navigation mode) according to an embodiment of the invention.

Figure 4:
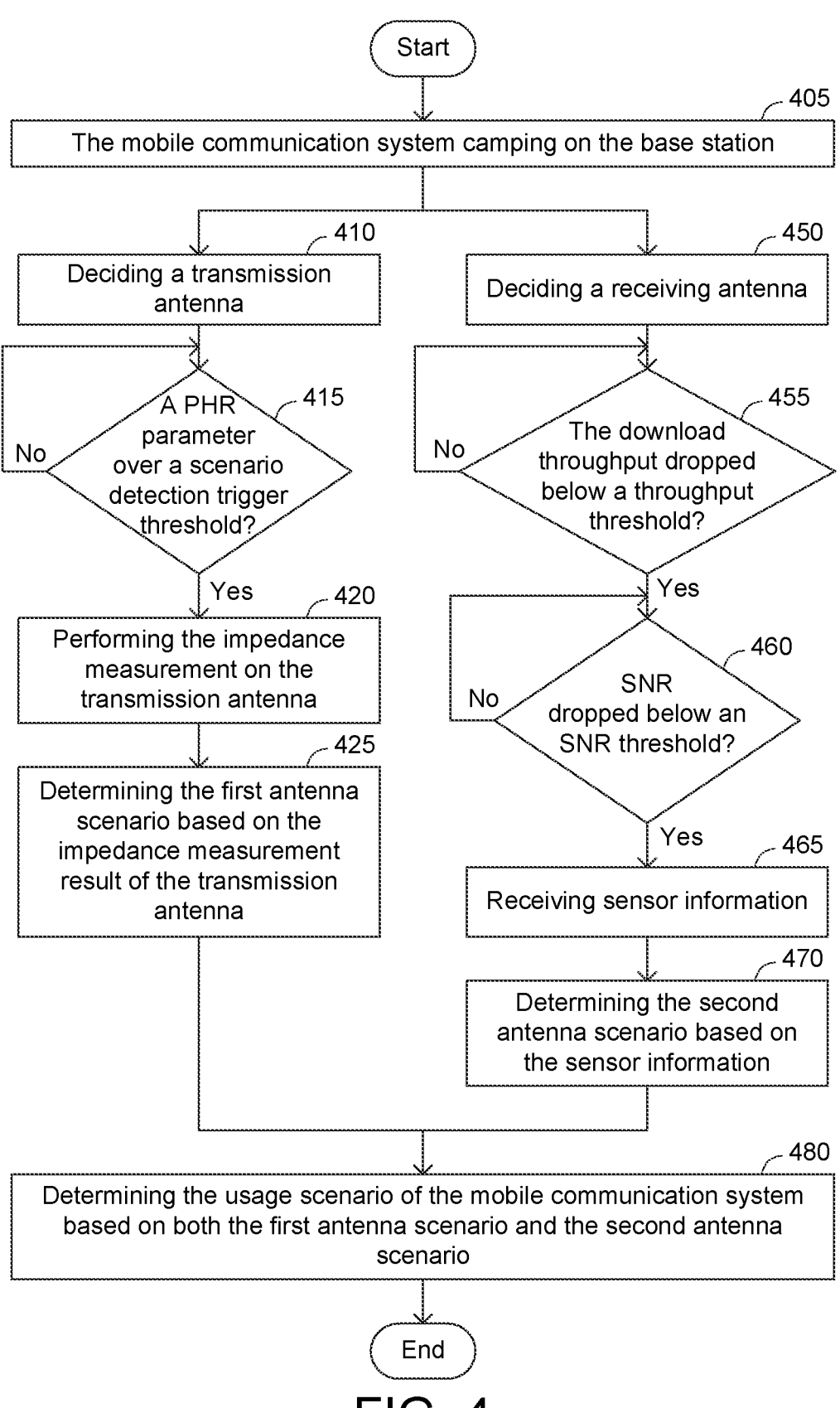
FIG. 4 shows another flow chart of a usage scenario determination method for a mobile communication system according to the first embodiment of the application.

FIG. 4 shows another flow chart of a usage scenario determination method for a mobile communication system according to the first embodiment of the application. In the step 405, the mobile communication system 100 camps on the base station. In step 410, the controller 130 decides a transmission antenna among the antenna group 110. In step 415, the controller 130 decides whether a power headroom (PHR) parameter is over a scenario detection trigger threshold. When the step 415 is yes, the flow proceeds to the step 420; and when the step 415 is no, the flow repeats the step 415. That is, when the PHR parameter is over the scenario detection trigger threshold, the impedance measurement on the transmission antenna is triggered by the controller 130.

In the step 420, the impedance measurement is performed on the transmission antenna. Details of impedance measurement are not specified here. In the step 425, the transmission antenna scenario (or said the first antenna scenario) is determined by the controller 130 based on the impedance measurement result of the transmission antenna. In one possible example, the transmission antenna scenario (or said the first antenna scenario) includes, for example but not limited by, a FS (free space) mode, a single hand mode and the like.

In the step 450, the controller 130 decides a receiving antenna among the antenna group 110. In step 455, the controller 130 determines whether the download throughput is dropped below a throughput threshold. When the step 455 is yes, the flow proceeds to the step 460; and when the step 455 is no, the flow repeats the step 455.

In step 460, the controller 130 determines whether the SNR (signal-noise ratio) is dropped below an SNR threshold. When the step 460 is yes, the flow proceeds to the step 465; and when the step 460 is no, the flow repeats the step 460. Sequence of the steps 455 and 460 may be variable, i.e. the step 460 may be performed before the step 455, which is still within the spirit and the scope of the application. That is, when the download throughput is dropped below the throughput threshold and when the SNR (signal-noise ratio) is dropped below the SNR threshold, collection of the sensor information is triggered by the controller 130.

In the step 465, the controller 130 receives the sensor information from the sensor 140 (i.e. the sensor information is collected). In the step 470, the receiving antenna scenario (or said the second antenna scenario) is determined by the controller 130 based on the sensor information from the sensor 140. In one possible example, the receiving antenna scenario (or said the second antenna scenario) includes, for example but not limited by, the FS (free space) mode, the single hand mode, a table mode and the like.

In the step 480, the controller 130 determines the usage scenario of the mobile communication system 100 based on both the transmission antenna scenario (or said the first antenna scenario) and the receiving antenna scenario (or said the second antenna scenario).

The steps 415, 455 and 460 are referred as a detection event. When the steps 415, 455 and 460 are all yes, the detection event is triggered to determine the usage scenario of the mobile communication system 100.

Second Embodiment

The hardware diagram of a mobile communication system according to a second embodiment of the invention is substantially the same or similar to that of the mobile communication system 100 according to the first embodiment of the invention. However, in the second embodiment of the application, the receiving antenna tuner 150 is necessary.

Figure 5:
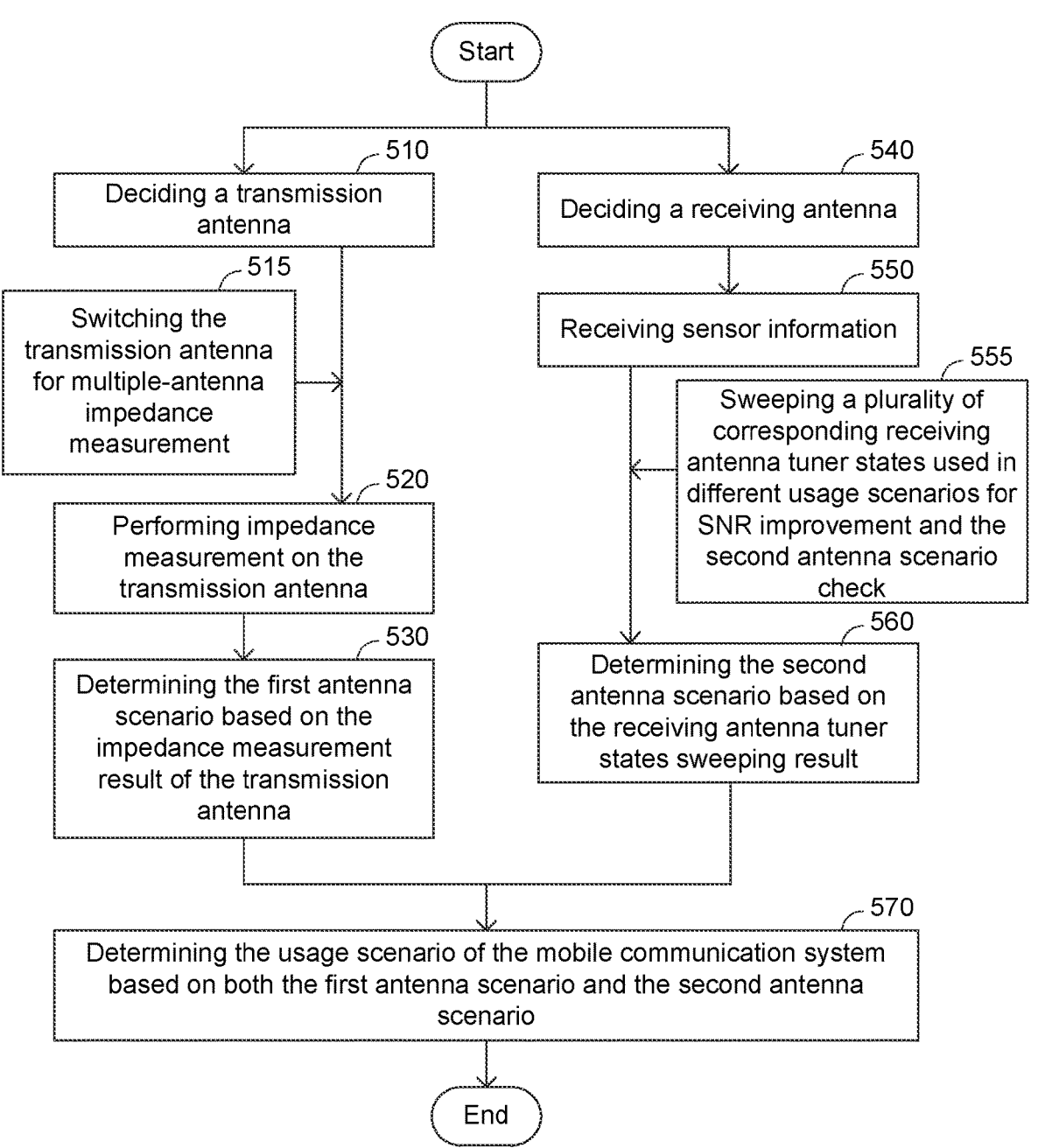
FIG. 5 shows a flow chart of a usage scenario determination method for a mobile communication system according to the second embodiment of the application.

FIG. 5 shows a flow chart of a usage scenario determination method for a mobile communication system according to the second embodiment of the application. In FIG. 5, the steps 510, 520, 530, 540, 550 and 570 are substantially the same or similar to the steps 210, 220, 230, 240, 250 and 270 in FIG. 2.

In step 515, the transmission antenna is switched. That is, a transmission antenna switching is added for multiple-antenna impedance measurement in the step 515.

In step 555, a plurality of corresponding receiving antenna tuner states used in different usage scenarios are sweeping by the controller 130 for SNR improvement and the second antenna scenario check. That is, in step 555, a plurality of corresponding receiving antenna tuner states used in different usage scenarios are sweeping by the controller 130 to generate a receiving antenna tuner states sweeping result before the controller 130 determines the second antenna scenario. In step 560, the second antenna scenario is determined based on the receiving antenna tuner states sweeping result.

Figure 6A:
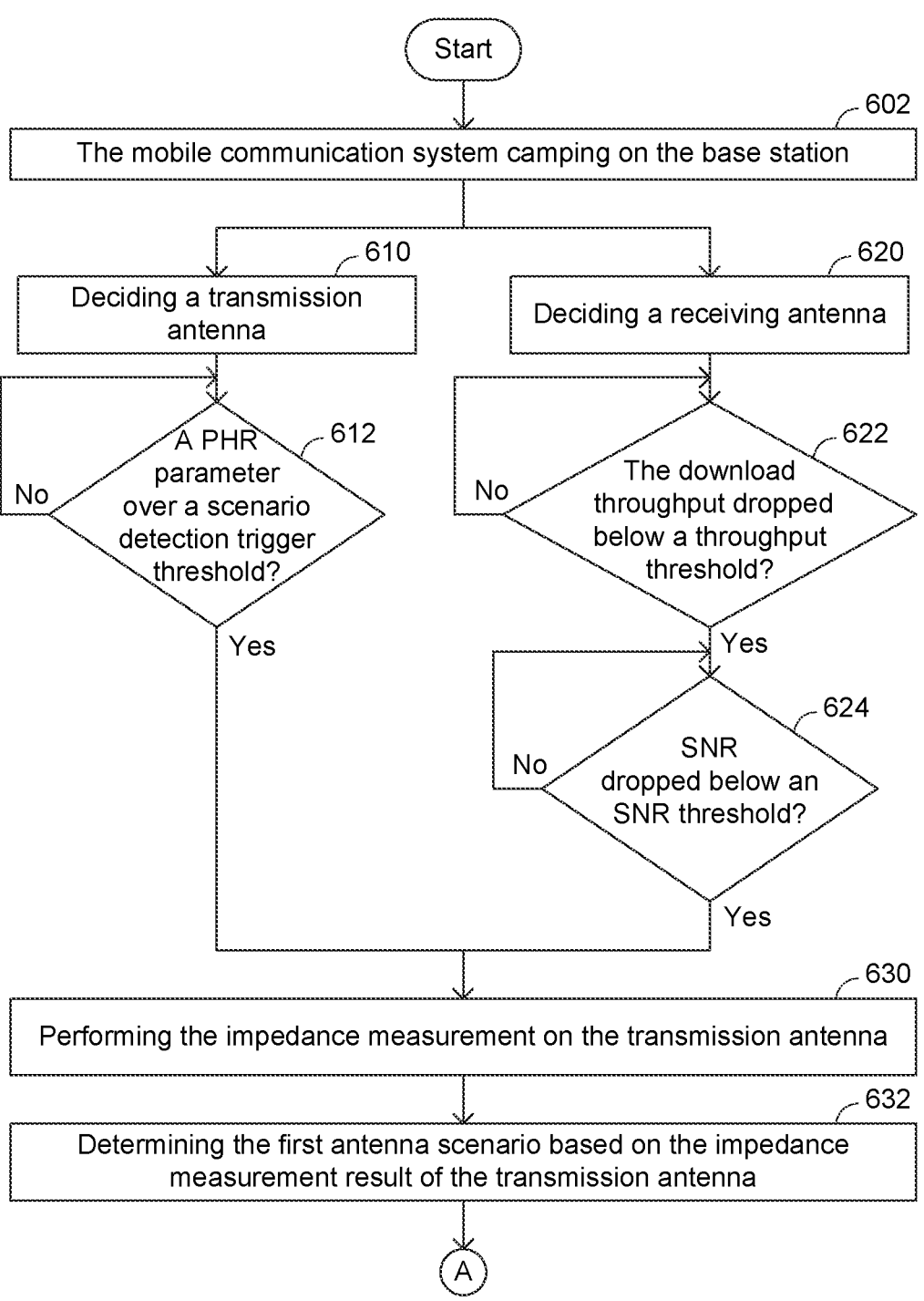
FIG. 6A-FIG. 6C show another flow chart of a usage scenario determination method for a mobile communication system according to the second embodiment of the application.
Figure 6B:
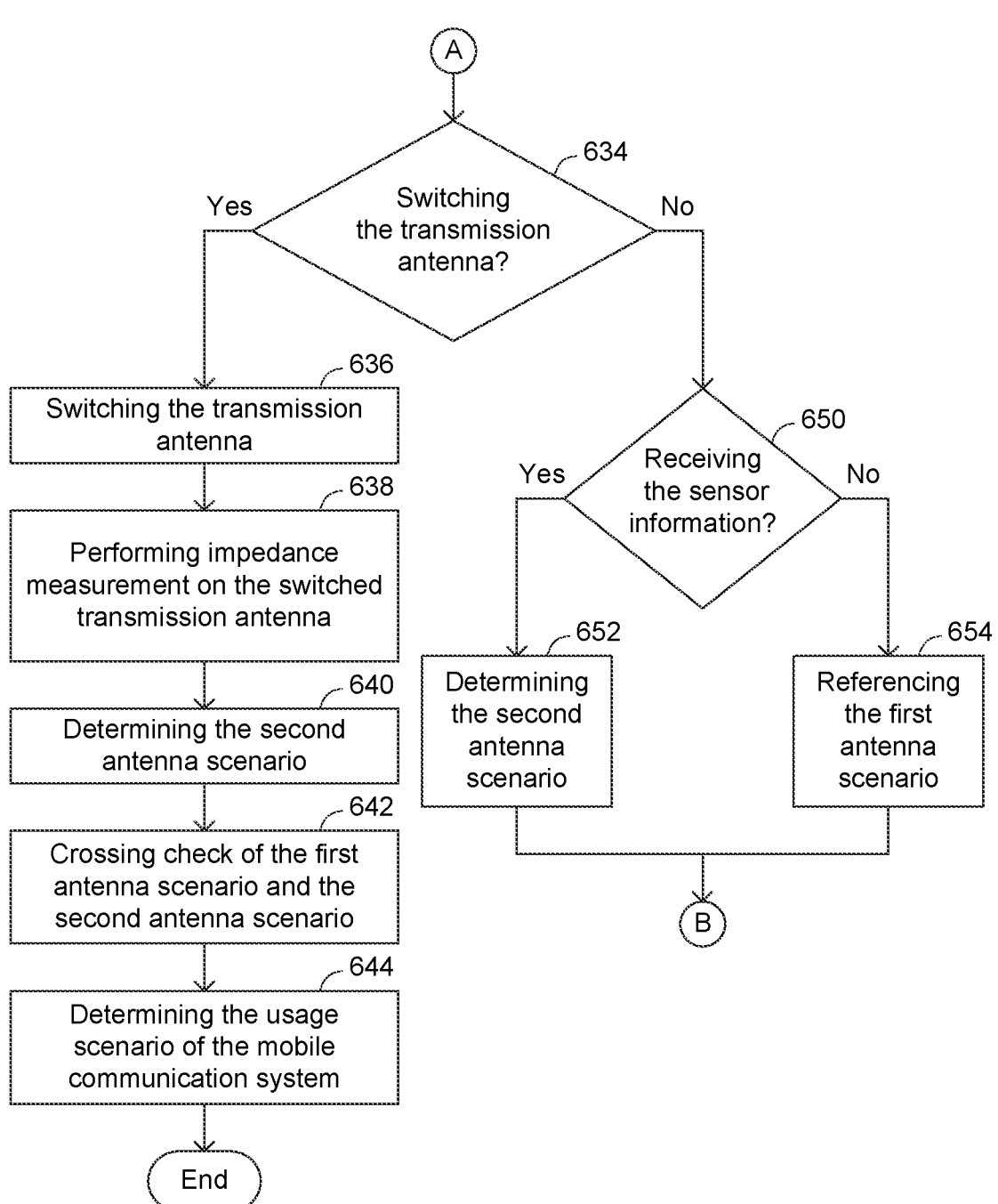
Figure 6C:
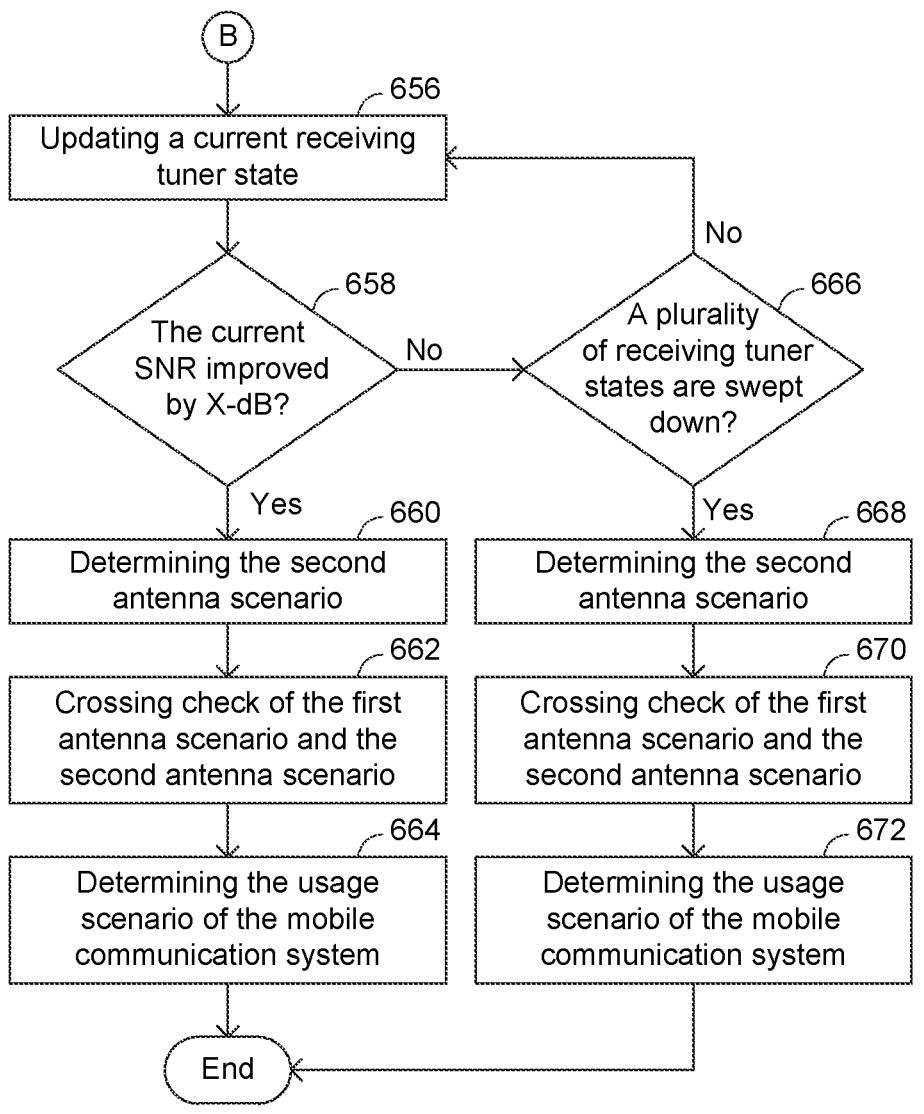

FIG. 6A-FIG. 6C show another flow chart of a usage scenario determination method for a mobile communication system according to the second embodiment of the application. In the step 602, the mobile communication system 100 camps on the base station. In step 610, the controller 130 decides a transmission antenna among the antenna group 110. In step 612, the controller 130 decides whether a power headroom (PHR) parameter is over a scenario detection trigger threshold. When the step 612 is yes, the flow proceeds to the step 630; and when the step 612 is no, the flow repeats the step 612.

In the step 620, the controller 130 decides a receiving antenna among the antenna group 110. In step 622, the controller 130 determines whether the download throughput is dropped below a throughput threshold. When the step 622 is yes, the flow proceeds to the step 624; and when the step 622 is no, the flow repeats the step 622.

In step 624, the controller 130 determines whether the SNR (signal-noise ratio) is dropped below an SNR threshold. When the step 624 is yes, the flow proceeds to the step 630; and when the step 624 is no, the flow repeats the step 624.

In the step 630, the impedance measurement is performed on the transmission antenna. Details of impedance measurement are not specified here. In the step 632, the transmission antenna scenario (or said the first antenna scenario) is determined by the controller 130 based on the impedance measurement result of the transmission antenna. In one possible example, the transmission antenna scenario (or said the first antenna scenario) includes, for example but not limited by, a FS (free space) mode, a single hand mode and the like.

In the step 634, the controller decides whether to switch the transmission antenna. When the step 634 is yes, the flow proceeds to the step 636, and when the step 634 is no, the flow proceeds to the step 650.

In the step 636, the controller switches the transmission antenna. In the step 638, the impedance measurement is performed on the switched transmission antenna. In the step 640, another transmission antenna scenario (or said the second antenna scenario) is determined by the controller 130 based on the impedance measurement result of the switched transmission antenna. In one possible example, the second antenna scenario determined by the controller 130 based on the impedance measurement result of the switched transmission antenna includes, for example but not limited by, the FS (free space) mode, the single hand mode, the table mode and the like.

In the step 642, the controller 130 crosses check of the first antenna scenario and the second antenna scenario. In the step 644, the controller 130 determines the usage scenario of the mobile communication system 100 based on both the first antenna scenario and the second antenna scenario.

In the step 650, the controller 130 determines whether the controller 130 receives the sensor information from the sensor 140. When the step 650 is yes, the flow proceeds to the step 652; and when the step 650 is no, the flow proceeds to the step 654.

In the step 652, the receiving antenna scenario (or said the second antenna scenario) is determined by the controller 130 based on the sensor information from the sensor 140. In one possible example, the receiving antenna scenario (or said the second antenna scenario) includes, for example but not limited by, the FS (free space) mode, the single hand mode, the table mode and the like.

In the step 654, the controller 130 takes the transmission antenna scenario (or said the first antenna scenario) in the step 632 as a reference.

In the step 656, the controller 130 updates a current receiving tuner state of the receiving antenna tuner 150 based on related information and the controller 130 receives a current SNR based on the current receiving tuner state. In the step 658, compared with the previous SNR (the previous SNR is measured based on the previous receiving tuner state) with the current SNR, the controller 130 determines whether the current SNR is improved by X-dB (X being a reference number).

When the step 658 is yes, the flow proceeds to the step 660; and when the step 658 is no, the flow proceeds to the step 666. Yes in the step 658 means that a best SNR is measured.

In the step 660, the receiving antenna scenario (or said the second antenna scenario) is determined by the controller 130 based on the receiving antenna tuner states sweeping result (similar to the steps 555 and 560) in case that a best SNR is measured. In the step 662, the controller 130 crosses check of the first antenna scenario and the second antenna scenario. In the step 664, the controller 130 determines the usage scenario of the mobile communication system 100 based on both the first antenna scenario and the second antenna scenario.

In the step 666, the controller 130 determines whether a plurality of receiving tuner states of the receiving antenna tuner 150 are swept down. When the step 666 is yes, the flow proceeds to the step 668; and when the step 666 is no, the flow returns to the step 656. By the step 656, 658 and 666, the receiving antenna performance is optimized by switching a plurality of receiving antenna tuner states and measuring a best SNR.

In the step 668 (which means the controller 130 determines a best SNR is measured), the receiving antenna scenario (or said the second antenna scenario) is determined by the controller 130 based on the receiving antenna tuner states sweeping result (similar to the steps 555 and 560). In the step 670, the controller 130 crosses check of the first antenna scenario and the second antenna scenario. In the step 672, the controller 130 determines the usage scenario of the mobile communication system 100 based on both the first antenna scenario and the second antenna scenario.

Embodiments of the application disclosure a usage scenario determination method to get the accurate usage scenario determination result, concluding transmission antenna switching, transmission antenna impedance measurement, sensor information and receiving antenna performance optimizing. Impedance measurement could be an input for user scenario detection to optimize user experience. Multi-antenna use for scenario confirmed could get the more accurate UE usage scenario determination.

In the above embodiments of the application, the impedance of the transmission antenna is used in determining the antenna scenario; and the sensor information is optionally used in determining the antenna scenario. By this configuration, the usage scenario of the mobile communication system is accurately determined, which may reduce the error determination rate.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a mobile communication system, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a mobile communication system, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A usage scenario determination method of a mobile communication system, comprising:

determining a first antenna scenario based on a first impedance measurement on a first transmission antenna;

determining a second antenna scenario based on either a second impedance measurement on a second transmission antenna or a sensor information or a receiving antenna tuner states sweeping result; and determining a usage scenario of the mobile communication system based on both the first antenna scenario and the second antenna scenario;

wherein the first antenna scenario includes a free space mode and a single hand mode;

the second antenna scenario includes the free space mode, the single hand mode and a table mode;

the usage scenario of the mobile communication system includes a single hand use mode, a gaming hand mode and a navigation mode;

when the first antenna scenario is the free space mode and the second antenna scenario is the single hand mode, the usage scenario of the mobile communication system is the single hand use mode;

when the first antenna scenario is the single hand mode and the second antenna scenario is the free space mode, the usage scenario of the mobile communication system is the single hand use mode;

when both the first antenna scenario and the second antenna scenario are the single hand mode, the usage scenario of the mobile communication system is the gaming hand mode; and when the first antenna scenario is the free space mode and the second antenna scenario is the table mode, the usage scenario of the mobile communication system is the navigation mode.

2. The usage scenario determination method according to claim 1, wherein:

when a power headroom (PHR) parameter is over a scenario detection trigger threshold, the first impedance measurement on the first transmission antenna is triggered.

3. The usage scenario determination method according to claim 1, wherein:

when a download throughput is dropped below a throughput threshold and when a SNR (signal-noise ratio) is dropped below an SNR threshold, collection of the sensor information is triggered.

4. The usage scenario determination method according to claim 1, further comprising:

sweeping a plurality of corresponding receiving antenna tuner states used in different usage scenarios to generate the receiving antenna tuner states sweeping result before determining the second antenna scenario.

5. The usage scenario determination method according to claim 1, further comprising:

cross-checking the first antenna scenario and the second antenna scenario before determining the usage scenario of the mobile communication system based on both the first antenna scenario and the second antenna scenario.

6. A mobile communication system, comprising:

an antenna group;

a coupler coupled to the antenna group, the coupler being used in impedance measurement of the antenna group;

a controller coupled to the coupler; and a sensor coupled to the controller, the sensor for sensing and sending sensor information to the controller, wherein the controller is configured for:

determining a first antenna scenario based on a first impedance measurement on a first transmission antenna of the antenna group;

determining a second antenna scenario based on either a second impedance measurement on a second transmission antenna of the antenna group or the sensor information or a receiving antenna tuner states sweeping result; and determining a usage scenario of the mobile communication system based on both the first antenna scenario and the second antenna scenario;

wherein the first antenna scenario includes a free space mode and a single hand mode;

the second antenna scenario includes the free space mode, the single hand mode and a table mode;

the usage scenario of the mobile communication system includes a single hand use mode, a gaming hand mode and a navigation mode;

when the first antenna scenario is the free space mode and the second antenna scenario is the single hand mode, the usage scenario of the mobile communication system is the single hand use mode;

when the first antenna scenario is the single hand mode and the second antenna scenario is the free space mode, the usage scenario of the mobile communication system is the single hand use mode;

when both the first antenna scenario and the second antenna scenario are the single hand mode, the usage scenario of the mobile communication system is the gaming hand mode; and when the first antenna scenario is the free space mode and the second antenna scenario is the table mode, the usage scenario of the mobile communication system is the navigation mode.

7. The mobile communication system according to claim 6, wherein:

when a power headroom (PHR) parameter is over a scenario detection trigger threshold, the controller triggers the first impedance measurement on the first transmission antenna.

8. The mobile communication system according to claim 6, wherein:

when a download throughput is dropped below a throughput threshold and when a SNR (signal-noise ratio) is dropped below an SNR threshold, the controller triggers collection of the sensor information.

9. The mobile communication system according to claim 6, further comprising a receiving antenna tuner coupled to the antenna group and the coupler, wherein the controller sweeps a plurality of corresponding receiving antenna tuner states used in different usage scenarios to generate the receiving antenna tuner states sweeping result before the controller determines the second antenna scenario.

10. The mobile communication system according to claim 6, wherein the controller cross-checks the first antenna scenario and the second antenna scenario before determining the usage scenario of the mobile communication system based on both the first antenna scenario and the second antenna scenario.

* * * * *